(12) United States Patent
Nakayama

(10) Patent No.: US 11,674,433 B2
(45) Date of Patent: Jun. 13, 2023

(54) WATERCRAFT PROPULSION SYSTEM AND WATERCRAFT INCLUDING THE WATERCRAFT PROPULSION SYSTEM

(71) Applicant: YAMAHA HATSUDOKI KABUSHIKI KAISHA, Iwata (JP)

(72) Inventor: Koichi Nakayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/889,562

(22) Filed: Aug. 17, 2022

(65) Prior Publication Data

US 2023/0083494 A1   Mar. 16, 2023

(30) Foreign Application Priority Data

Sep. 14, 2021   (JP) .............................. JP2021-149392

(51) Int. Cl.
| | |
|---|---|
| F02D 41/24 | (2006.01) |
| F02B 61/04 | (2006.01) |
| F02D 23/00 | (2006.01) |
| F02D 41/14 | (2006.01) |
| F02M 35/16 | (2006.01) |

(52) U.S. Cl.
CPC .......... *F02B 61/045* (2013.01); *F02D 23/005* (2013.01); *F02D 41/1475* (2013.01); *F02D 41/2454* (2013.01); *F02M 35/167* (2013.01)

(58) Field of Classification Search
CPC ............. F02D 41/1475; F02D 41/2454; F02D 23/005; F02M 35/167; F02B 61/045

USPC ......................... 123/436, 672, 674, 676, 687; 701/103–105, 110; 440/87, 88 a, 88 f
See application file for complete search history.

(56) References Cited

U.S. PATENT DOCUMENTS

2006/0185656 A1   8/2006   Miyauchi et al.

FOREIGN PATENT DOCUMENTS

| JP | 3562047 | * | 9/2004 | ............. F02D 41/04 |
| JP | 2004245085 | * | 9/2004 | ............. F02D 41/14 |
| JP | 2004308455 | * | 11/2004 | ............. F02D 41/14 |
| JP | 3829553 B2 | | 10/2006 | |

* cited by examiner

*Primary Examiner* — Hai H Huynh
(74) *Attorney, Agent, or Firm* — Keating and Bennett, LLP

(57) ABSTRACT

A watercraft propulsion system includes a propulsion unit to be driven by an engine. The engine includes a cylinder block, an air intake channel, an exhaust channel, a supercharging device, and a fuel injector. The watercraft propulsion system includes the engine, the propulsion unit to be driven by the engine, a rotation speed sensor to detect a rotation speed of the engine, an air intake pressure sensor to detect an air intake pressure of the engine, and a controller. The controller is configured or programmed to compute a command fuel injection amount so that the engine performs a combustion operation at an air/fuel ratio in a lean-burn range (lean-combustion range) according to the rotation speed detected by the rotation speed sensor and the air intake pressure detected by the air intake pressure sensor, and to drive the fuel injector based on the computed command fuel injection amount.

11 Claims, 10 Drawing Sheets

WATERCRAFT PROPULSION SYSTEM AND WATERCRAFT INCLUDING THE WATERCRAFT PROPULSION SYSTEM

CROSS REFERENCE TO RELATED APPLICATIONS

This application claims the benefit of priority to Japanese Patent Application No. 2021-149392 filed on Sep. 14, 2021. The entire contents of this application are hereby incorporated herein by reference.

BACKGROUND OF THE INVENTION

1. Field of the Invention

The present invention relates to a watercraft propulsion system, and a watercraft including the watercraft propulsion system.

2. Description of the Related Art

JP 3829553 discloses an outboard motor which provides a higher output power with the use of a supercharging device.

US 2006/0185656 A1 discloses an outboard motor which utilizes lean-burn engine control.

SUMMARY OF THE INVENTION

The inventor of preferred embodiments of the present invention described and claimed in the present application conducted an extensive study and research regarding a watercraft propulsion system, such as the ones described above, and in doing so, discovered and first recognized new unique challenges and previously unrecognized possibilities for improvements as described in greater detail below.

A watercraft propulsion system which includes a supercharging device for a higher output power and has a fuel efficiency improved by the lean-burn control is disclosed in neither JP 3829553 nor US 2006/0185656 A1, and is not available in the market.

Preferred embodiments of the present invention provide watercraft propulsion systems each of which includes a supercharging device and an engine able to perform a lean-burn operation, and watercrafts including the watercraft propulsion systems.

In order to overcome the previously unrecognized and unsolved challenges described above, a preferred embodiment of the present invention provides a watercraft propulsion system which drives a propulsion unit by an engine. The engine includes a cylinder block, an air intake channel connected to the cylinder block, an exhaust channel connected to the cylinder block, a supercharging device provided in the air intake channel, and a fuel injector. The watercraft propulsion system includes the engine, the propulsion unit to be driven by the engine, a rotation speed sensor to detect a rotation speed of the engine, an air intake pressure sensor to detect an air intake pressure of the engine, and a controller configured or programmed to compute a command fuel injection amount so that the engine performs a combustion operation at an air/fuel ratio in a lean-burn range (lean-combustion range) according to the rotation speed detected by the rotation speed sensor and the air intake pressure detected by the air intake pressure sensor, and to drive the fuel injector based on the computed command fuel injection amount.

With this arrangement, the watercraft propulsion system including the supercharging device and the engine able to perform the lean-burn operation is provided. The command fuel injection amount is computed based on the rotation speed and the air intake pressure of the engine, and the fuel injector is driven based on the command fuel injection amount such that the combustion operation is performed in the lean-burn range. The provision of the supercharging device makes it possible to provide a higher output power, and the lean-burn operation improves the fuel efficiency.

In a preferred embodiment of the present invention, the controller is configured or programmed to compute the command fuel injection amount so that the engine performs the combustion operation at an air/fuel ratio of not lower than about 15 and not higher than about 25, more specifically not lower than about 20 and not higher than about 23.5, and still more specifically not lower than about 21 and not higher than about 22.

In a preferred embodiment of the present invention, the concentration of nitrogen oxide in exhaust gas generated by the engine is zero or substantially zero (specifically less than about 500 ppm) without use of an exhaust gas cleaning catalyst in the exhaust channel.

In a preferred embodiment of the present invention, the concentration of carbon monoxide in the exhaust gas generated by the engine is zero or substantially zero (specifically less than about 1%) without the provision of the exhaust gas cleaning catalyst in the exhaust channel.

In a preferred embodiment of the present invention, the concentration of hydrocarbons in the exhaust gas generated by the engine is less than about 2,000 ppm without the provision of the exhaust gas cleaning catalyst in the exhaust channel.

In a preferred embodiment of the present invention, the watercraft propulsion system further includes an air/fuel ratio sensor in the exhaust channel. The controller is configured or programmed to function as a target fuel injection amount computation unit to compute a target fuel injection amount of a target air/fuel ratio to be set within the lean-burn range according to the rotation speed detected by the rotation speed sensor and the air intake pressure detected by the air intake pressure sensor, and as a correction unit to correct the target fuel injection amount through feedback control by comparing the target air/fuel ratio with an actual air/fuel ratio detected by the air/fuel ratio sensor in order to compute the command fuel injection amount.

In a preferred embodiment of the present invention, the supercharging device includes a supercharger to be driven by the rotation of the crank shaft of the engine.

In a preferred embodiment of the present invention, the supercharging device includes a turbocharger to be driven by exhaust gas flowing through the exhaust channel.

In a preferred embodiment of the present invention, the watercraft propulsion system is an outboard motor. In this case, the crank shaft of the engine extends vertically. The watercraft propulsion system includes a drive shaft extending vertically and connected to the crank shaft, a propeller shaft extending horizontally, a propeller connected to the propeller shaft and functioning as the propulsion unit, and a transmission to transmit the rotation of the drive shaft to the propeller shaft.

In a preferred embodiment of the present invention, a watercraft is provided, which includes a hull, and a watercraft propulsion system provided in the hull to apply a propulsive force to the hull, wherein the watercraft propulsion system includes the above-described structure.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
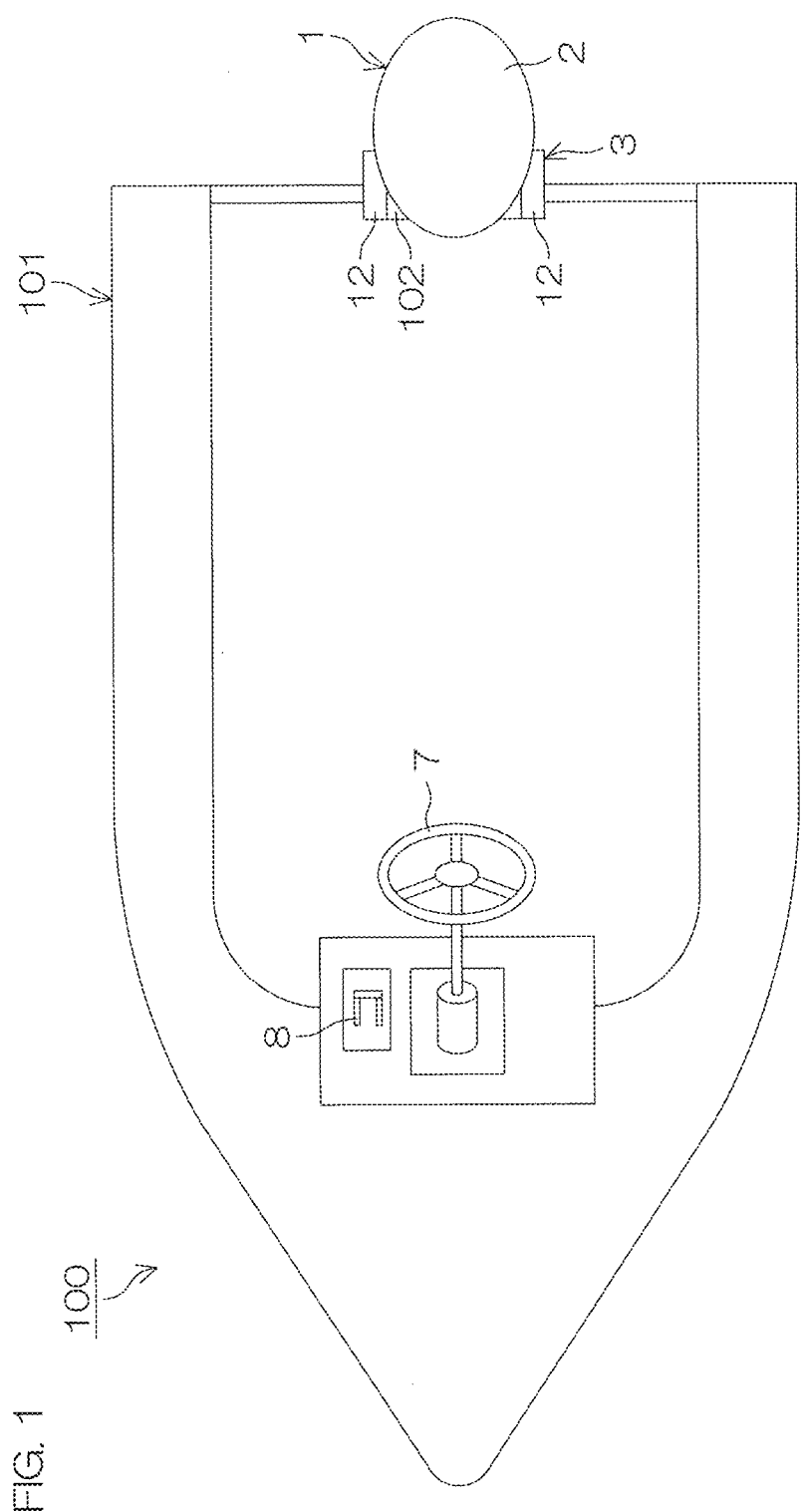
FIG. 1 is a conceptual diagram for describing the structure of a watercraft according to a preferred embodiment of the present invention.

FIG. 1 is a conceptual diagram for describing the structure of a watercraft 100 according to a preferred embodiment of the present invention. The watercraft 100 includes a hull 101 and an outboard motor 1. The outboard motor 1 is attached to the stern of the hull 101. The outboard motor 1 is an example of the watercraft propulsion system which applies a propulsive force to the hull 101. A steering wheel 7 as an operation element to steer and an acceleration lever 8 as an operation element to adjust the output of the outboard motor 1 are provided in the hull 101. The outboard motor 1 has a forward shift position, a neutral shift position, and a reverse shift position. The acceleration lever 8 also functions as a shift change operation element to change the shift position of the outboard motor 1.

Figure 2:
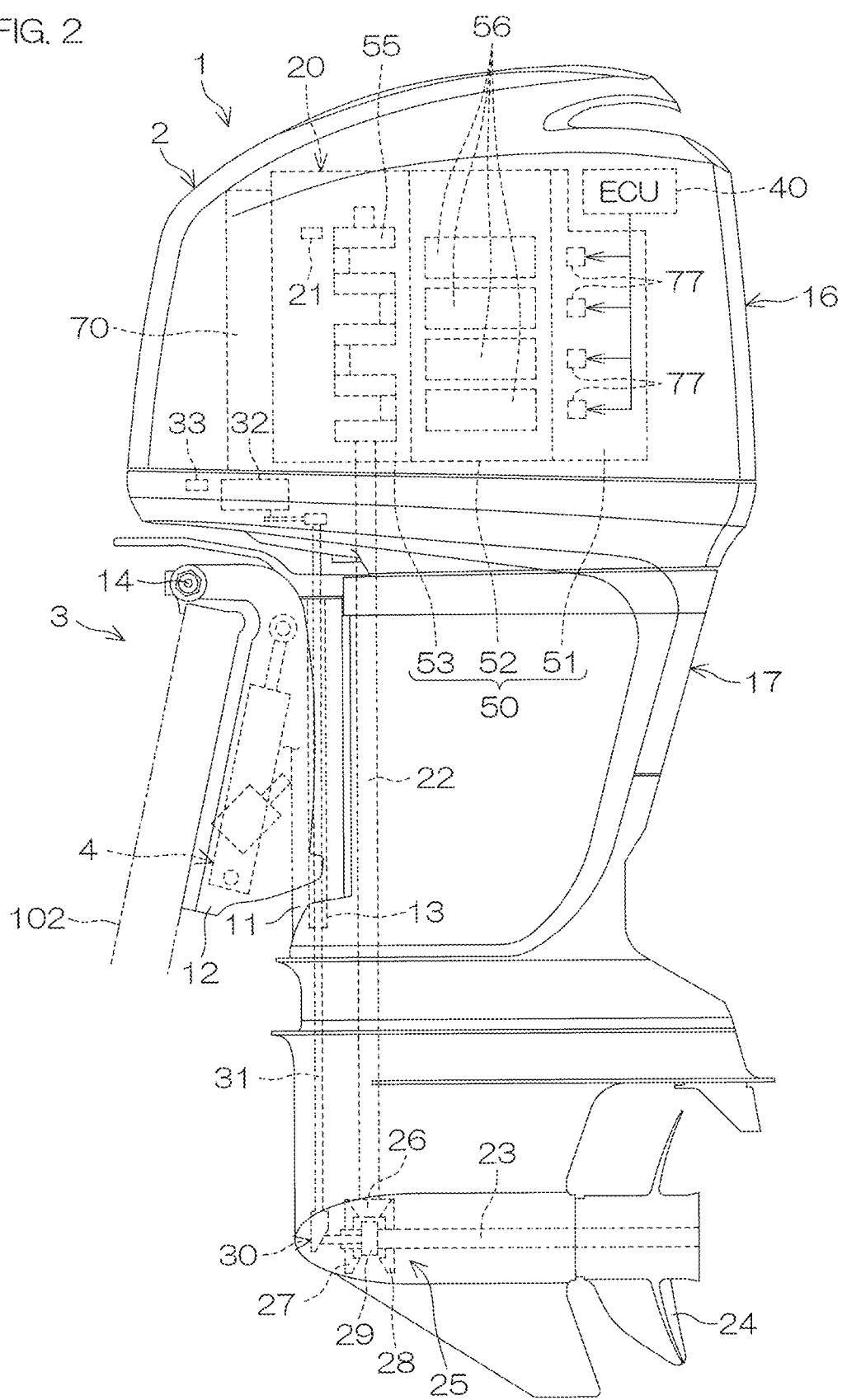
FIG. 2 is a side view for describing the structure of an outboard motor by way of example.

FIG. 2 is a side view for describing the structure of the outboard motor 1 by way of example. The outboard motor 1 includes an engine 20 (internal combustion engine) as a driving source. The outboard motor 1 includes an outboard motor body 2 and an attachment mechanism 3. The outboard motor body 2 is attached to the stern of the hull 101 by the attachment mechanism 3. The attachment mechanism 3 includes a swivel bracket 11, a pair of clamp brackets 12, a steering shaft 13, and a tilt shaft 14. The steering shaft 13 extends vertically. The tilt shaft 14 extends horizontally and laterally. The swivel bracket 11 is connected to the outboard motor body 2 via the steering shaft 13. The pair of clamp brackets 12 are spaced apart laterally. The clamp brackets 12 clamp an attachment plate 102 provided at the stern of the hull 101 which functions as a fixture member to fix the outboard motor body 2 to the hull 101.

The outboard motor body 2 is attached in a substantially vertical attitude to the hull 101 by the attachment mechanism 3. The outboard motor body 2 and the swivel bracket 11 are pivotable about the tilt shaft 14 up and down with respect to the clamp brackets 12. The outboard motor body 2 and the swivel bracket 11 are pivoted about the tilt shaft 14 up and down by a tilt-trim mechanism 4. The tilt-trim mechanism 4 includes, for example, a hydraulic cylinder. By operating the tilt-trim mechanism 4, the tilt angle of the outboard motor body 2 with respect to the hull 101 is able to be controlled for trim adjustment, and a tilt up/tilt down operation is able to be performed to move up the outboard motor body 2 out of the water and move down the outboard motor body 2 into the water. Further, the outboard motor body 2 is pivotable about the steering shaft 13 laterally with respect to the swivel bracket 11. According to the operation of the steering wheel 7, the outboard motor body 2 is pivoted about the steering shaft 13 thus steering the watercraft 100.

The outboard motor body 2 includes the engine 20, a drive shaft 22, a propeller shaft 23, a propeller 24, a forward/reverse switching mechanism 25, and an ECU (electronic control unit) 40. The propeller 24 is an example of the propulsion unit. The ECU 40 is an example of the controller. The outboard motor body 2 includes an engine cover 16 and a casing 17. The engine 20 and the ECU 40 are accommodated in the engine cover 16. The engine 20 includes a crank shaft 55 extending vertically. The drive shaft 22 is connected to the crank shaft 55. The drive shaft 22 extends vertically in the engine cover 16 and the casing 17. The propeller shaft 23 extends horizontally in a front and back direction in the casing 17. The upper end of the drive shaft 22 is connected to the crank shaft 55, and the lower end of the drive shaft 22 is connected to the propeller shaft 23 via the forward/reverse switching mechanism 25 in a power transmittable manner. The forward/reverse switching mechanism 25 is an example of the transmission mechanism which transmits the rotation of the drive shaft 22 to the propeller shaft 23. The propeller 24 is connected to the rear end of the propeller shaft 23. The propeller 24 is rotated together with the propeller shaft 23. Therefore, the power of the engine 20 is transmitted to the propeller 24 via the drive shaft 22, the forward/reverse switching mechanism 25 and the propeller shaft 23 to rotate the propeller 24.

The forward/reverse switching mechanism 25 includes a driving gear 26, a forward gear 27, a reverse gear 28, a dog clutch 29, and a shift mechanism 30. The driving gear 26, the forward gear 27, and the reverse gear 28 are bevel gears. The driving gear 26 is fixed to the lower end of the drive shaft 22. The forward gear 27 and the reverse gear 28 are provided around the front end portion of the propeller shaft 23, and the propeller shaft 23 extends through the forward gear 27 and the reverse gear 28. The forward gear 27 and the reverse gear 28 are rotatable with respect to the propeller shaft 23. The forward gear 27 and the reverse gear 28 are constantly engaged with the driving gear 26. By rotating the driving gear 26, the forward gear 27 and the reverse gear 28 are rotated in opposite directions on the propeller shaft 23.

The forward gear 27 and the reverse gear 28 are spaced apart in the front and back direction, and the dog clutch 29 is between the forward gear 27 and the reverse gear 28. The dog clutch 29 is a slider which is spline-connected to the propeller shaft 23 to be rotatable together with the propeller shaft 23 and is slidable in the front and back direction with respect to the propeller shaft 23. The dog clutch 29 is moved axially of the propeller shaft 23 in the front and back direction by the shift mechanism 30. The shift mechanism 30 includes, for example, a shift rod 31 extending vertically, a shift actuator 32 connected to the upper end of the shift rod 31, and a shift position sensor 33 which detects the position of the dog clutch 29 as the shift position. The shift actuator 32 is operated according to the operation of the acceleration lever 8. The shift rod 31 is pivoted by the shift actuator 32 such that the dog clutch 29 is moved axially on the propeller shaft 23. Thus, the dog clutch 29 is located at one of the forward shift position, the reverse shift position, and the neutral shift position. At the forward position, the dog clutch 29 is meshed with the forward gear 27 such that the propeller shaft 23 and the propeller 24 are rotated in a forward drive direction. At the reverse position, the dog clutch 29 is meshed with the reverse gear 28 such that the propeller shaft 23 and the propeller 24 are rotated in a reverse drive direction. At the neutral position, the dog clutch 29 is meshed with neither the forward gear 27 nor the reverse gear 28 such that the power is not transmitted between the drive shaft 22 and the propeller shaft 23.

The engine 20 is an internal combustion engine which generates power by combustion of a fuel. The engine 20 includes the crank shaft 55, a plurality of cylinders 56 (e.g., four cylinders 56), and a cylinder block 50 which accommodates the crank shaft 55 and the cylinders 56. The cylinder block 50 includes a cylinder head 51, a cylinder body 52, and a crank case 53. The crank shaft 55 is driven to be rotated about a vertical axis by the combustion in the cylinders 56. The rotation speed of the crank shaft 55 (engine rotation speed) is detected by a rotation speed sensor 21 and the ECU 40. The rotation speed sensor 21 may be a crank angle sensor which outputs a detection signal (crank pulse) in synchronism with the rotation of the crank shaft 55. The engine 20 includes a plurality of ignition plugs 75 (see FIG. 3) provided for the respective cylinders 56, and a plurality of ignition coils 76 (see FIG. 4) provided for the respective ignition plugs 75. The engine 20 further includes a plurality of fuel injectors 77 provided for the respective cylinders 56. In the present preferred embodiment, the engine 20 includes a supercharging device 70. The supercharging device 70 is located, for example, in front of the cylinder block 50 in the engine cover 16. The supercharging device 70 may be a supercharger 70A (see FIG. 3) which is driven by the rotation of the crank shaft 55.

Figure 3:
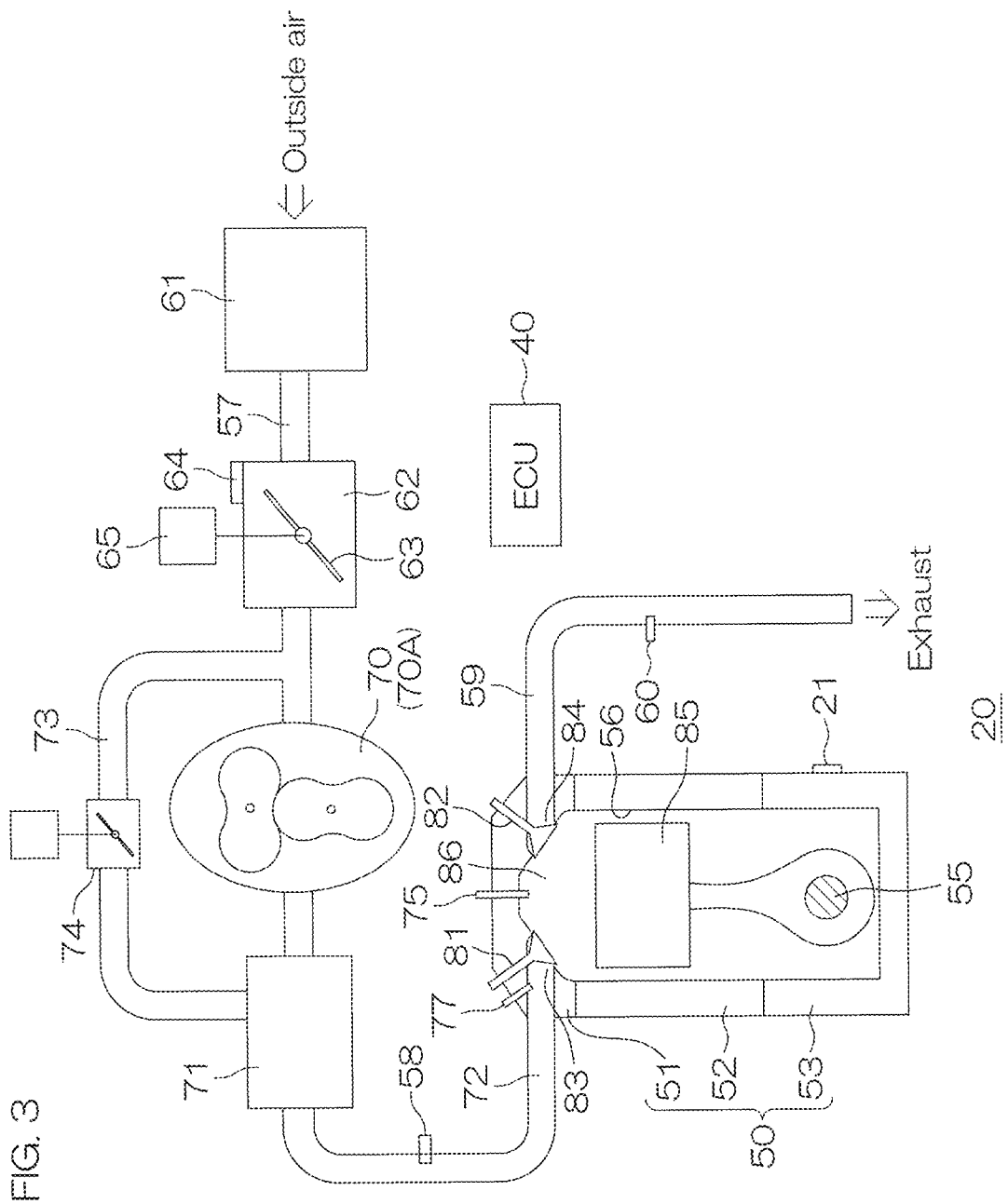
FIG. 3 is a conceptual diagram for describing an exemplary structure related to an engine.

FIG. 3 is a conceptual diagram for describing an exemplary structure related to the engine 20. The engine 20 includes the cylinder block 50, an air intake channel 57 connected to the cylinder block 50, an exhaust channel 59 connected to the cylinder block 50, the supercharging device 70 provided in the air intake channel 57, and the fuel injectors 77. Outside air is taken into a throttle body 62 through an air intake silencer 61 from an air inlet port provided in the engine cover 16 (see FIG. 2). The air taken into the throttle body 62 is compressed by the supercharger 70A (an example of the supercharging device 70), and then introduced into an air cooler 71 (intercooler) to be cooled. The cooled air is introduced into the cylinder head 51 through an intake manifold 72.

The supercharger 70A is connected to the crank shaft 55 in a power transmittable manner, and is operated by the rotation of the crank shaft 55. The power transmission between the supercharger 70A and the crank shaft 55 is achieved by a power transmission mechanism such as a belt. In a specific example, the supercharger 70A may be constantly operated during the operation of the engine 20 without use of a power cutoff device such as a clutch in the power transmission path. In another specific example, the ON and OFF of the power transmission may be controlled according to the operation state of the engine 20 by a power cutoff device such as a clutch provided in the power transmission path to correspondingly control the operation of the supercharger 70A.

An air bypass channel 73 to bypass the supercharger 70A is connected to the air intake channel 57. In the present preferred embodiment, one of opposite ends of the air bypass channel 73 is connected to the air cooler 71, and the other end of the air bypass channel 73 is connected to the air intake channel 57 upstream of the supercharger 70A, more specifically, between the supercharger 70A and the throttle body 62. An air bypass valve 74 is provided in the air bypass channel 73 to open and close the air bypass channel 73.

The intake manifold 72 is connected to the cylinder head 51. The cylinder head 51 is provided with the fuel injectors 77, the ignition plugs 75, air intake valves 81, and exhaust valves 82, and includes air intake ports 83 and exhaust ports 84. The air intake valves 81 open and close the respective air intake ports 83 of the cylinder head 51. The exhaust valves 82 open and close the respective exhaust ports 84 of the cylinder head 51. The cylinders 56 are provided in the cylinder body 52, and pistons 85 are reciprocally movable in the respective cylinders 56. Combustion chambers 86 are between the pistons 85 and the cylinder head 51 in the respective cylinders 56. The ignition plugs 75 ignite a fuel-air mixture in the respective combustion chambers 86 by spark discharge.

Exhaust gas resulting from the combustion is exhausted from the exhaust ports 84 to the outside through the exhaust channel 59. In the present preferred embodiment, no catalytic converter is provided in the exhaust channel 59. An air/fuel ratio sensor 60 is provided in the exhaust channel 59. The air/fuel ratio sensor 60 is a sensor which provides an output continuously (e.g., linearly) varying according to the concentration of oxygen in the exhaust gas, and may be a linear A/F sensor or the like.

An air intake pressure sensor 58 which detects the air intake pressure is provided in the air intake channel 57. In the present preferred embodiment, the air intake pressure sensor 58 is in the intake manifold 72.

The throttle body 62 includes a throttle valve 63 which has an opening degree varying according to the operation of the acceleration lever 8, and a throttle opening degree sensor 64 which detects the opening degree of the throttle valve 63. The throttle valve 63 may be configured so that the operation of the acceleration lever 8 is mechanically transmitted thereto, or may be connected to a throttle actuator 65 which is driven according to the operation of the acceleration lever 8.

Figure 4:
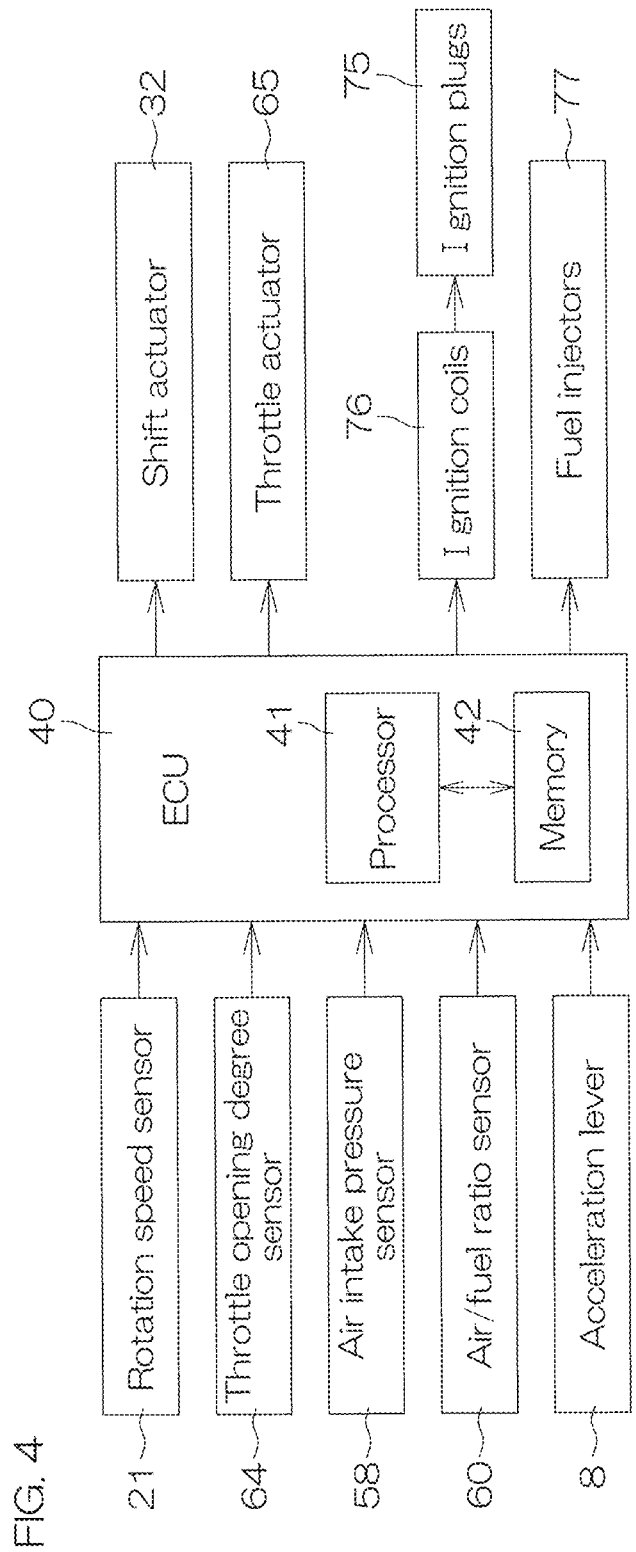
FIG. 4 is a block diagram for describing an electrical configuration related to the control of the engine.

FIG. 4 is a block diagram for describing an electrical configuration related to the control of the engine 20. The output signals of the rotation speed sensor 21, the throttle opening degree sensor 64, the air intake pressure sensor 58, the air/fuel ratio sensor 60 and the like are inputted to the ECU 40. Further, the operation signal of the acceleration lever 8 is inputted to the ECU 40. The shift actuator 32, the throttle actuator 65, the ignition coils 76, the fuel injectors 77 and the like are connected as control objects to the ECU 40.

The ECU 40 includes a processor 41 (CPU) and a memory 42. The memory 42 stores a program to be executed by the processor 41, and various data. The processor 41 executes the program stored in the memory 42 such that the ECU 40 functions as various processing units. That is, the ECU 40 is configured or programmed so as to function as the following processing units, i.e., so as to virtually include the various processing units.

Figure 5:
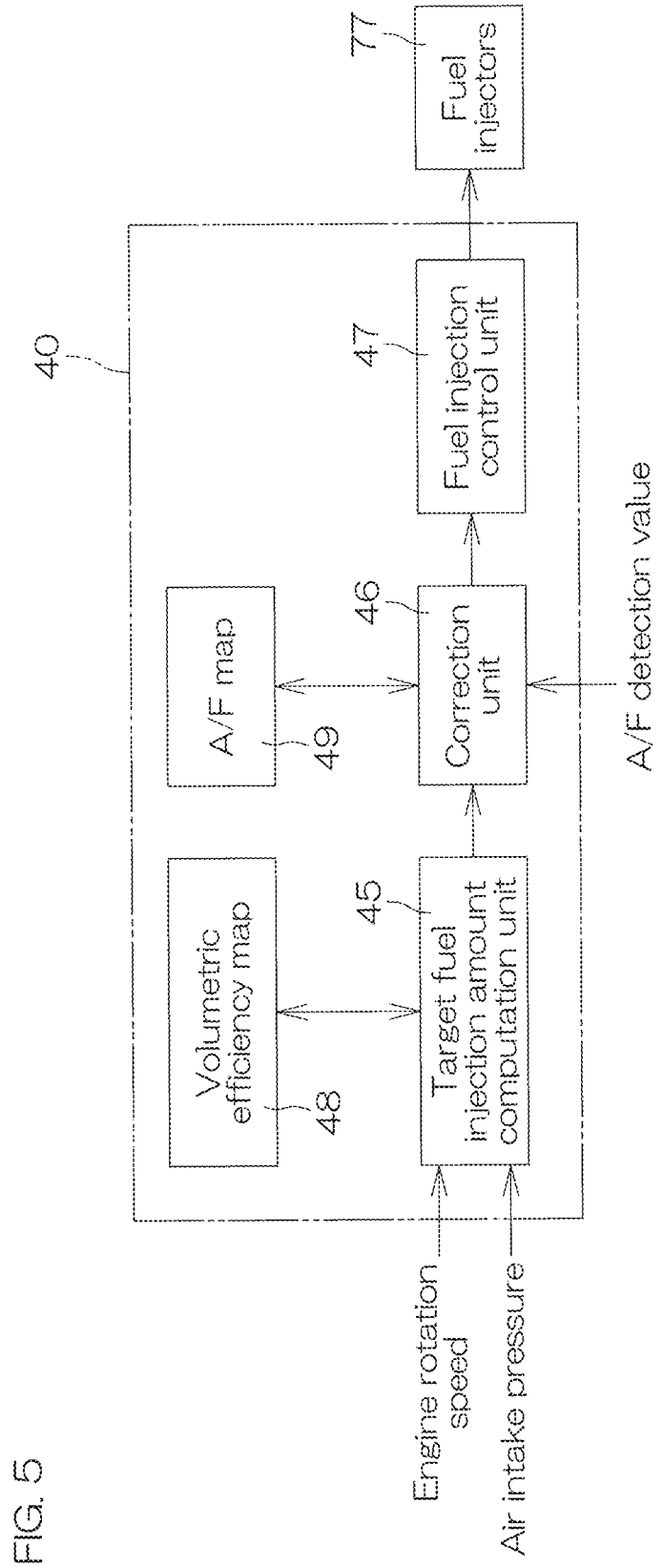
FIG. 5 is a control block diagram for describing the functions of an ECU to control the fuel injectors.

FIG. 5 is a control block diagram for describing the functions of the ECU 40 related to the control of the fuel injectors 77. The virtual functional processing units of the ECU 40 include a target fuel injection amount computation unit 45 which computes a target fuel injection amount, a correction unit 46 which corrects the target fuel injection amount to compute a command fuel injection amount, and a fuel injection control unit 47 which drives the fuel injectors 77 based on the command fuel injection amount. The data to be stored in the memory 42 includes a volumetric efficiency map 48 which stores volumetric efficiency values for various values of the air intake pressure and the engine rotation speed, and an A/F map 49 which stores fuel injection amount correction coefficients for various values of an actual air/fuel ratio to be detected by the air/fuel ratio sensor 60 to provide the target air/fuel ratio. In the present preferred embodiment, the target air/fuel ratio is set within a lean-burn range.

Figure 6:
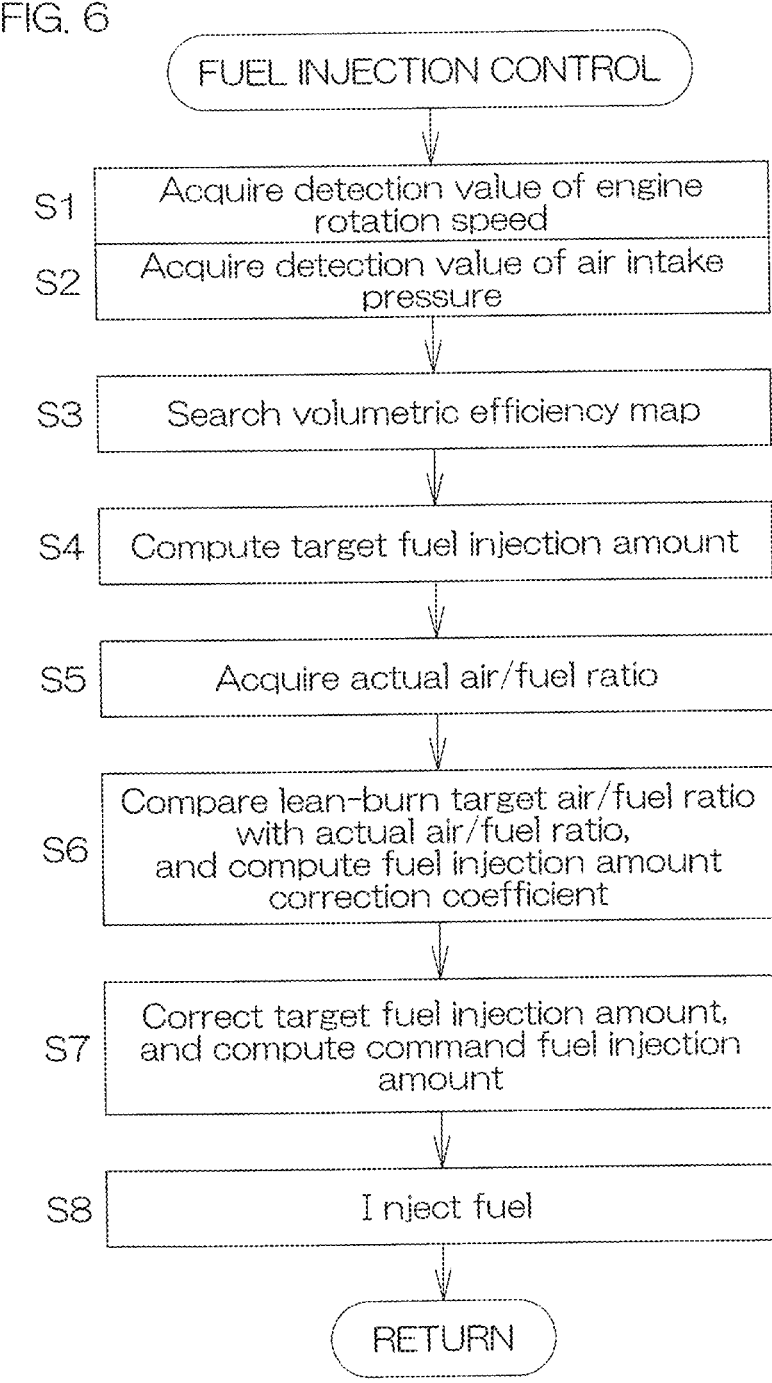
FIG. 6 is a flowchart for describing a process to be performed by the ECU to control the fuel injectors.

FIG. 6 is a flowchart for describing a process to be performed by the ECU 40 for the control of the fuel injectors 77. The ECU 40 acquires an engine rotation speed based on the output of the rotation speed sensor 21 (Step S1), and acquires an air intake pressure from the air intake pressure sensor 58 (Step S2). The engine rotation speed is determined, for example, by measuring a time interval of crank pulses outputted from the rotation speed sensor 21. The ECU 40 searches the volumetric efficiency map 48 based on the engine rotation speed and the air intake pressure (Step S3), and determines a target fuel injection amount for the engine rotation speed and the air intake pressure (Step S4, which is a function as the target fuel injection amount computation unit 45).

Further, the ECU 40 acquires a voltage value outputted from the air/fuel ratio sensor 60 (Step S5), and searches the A/F map 49 based on the outputted voltage value to acquire a fuel injection amount correction coefficient that permits the air/fuel ratio (actual air/fuel ratio) actually detected by the air/fuel ratio sensor 60 to match with the target air/fuel ratio (Step S6). In the present preferred embodiment, the target air/fuel ratio is set within the lean-burn range. Further, the ECU 40 determines a command fuel injection amount by multiplying the target fuel injection amount by the fuel injection amount correction coefficient (Step S7, which is a function of the correction unit 46 which corrects the target fuel injection amount). Thus, the ECU 40 corrects the target fuel injection amount through feedback control by comparing the target air/fuel ratio set in the lean-burn range with the actual air/fuel ratio to determine the command fuel injection amount.

At fuel injection timings, the ECU 40 controls the fuel injectors 77 based on the command fuel injection amount to inject the fuel (Step S8).

Figure 7:
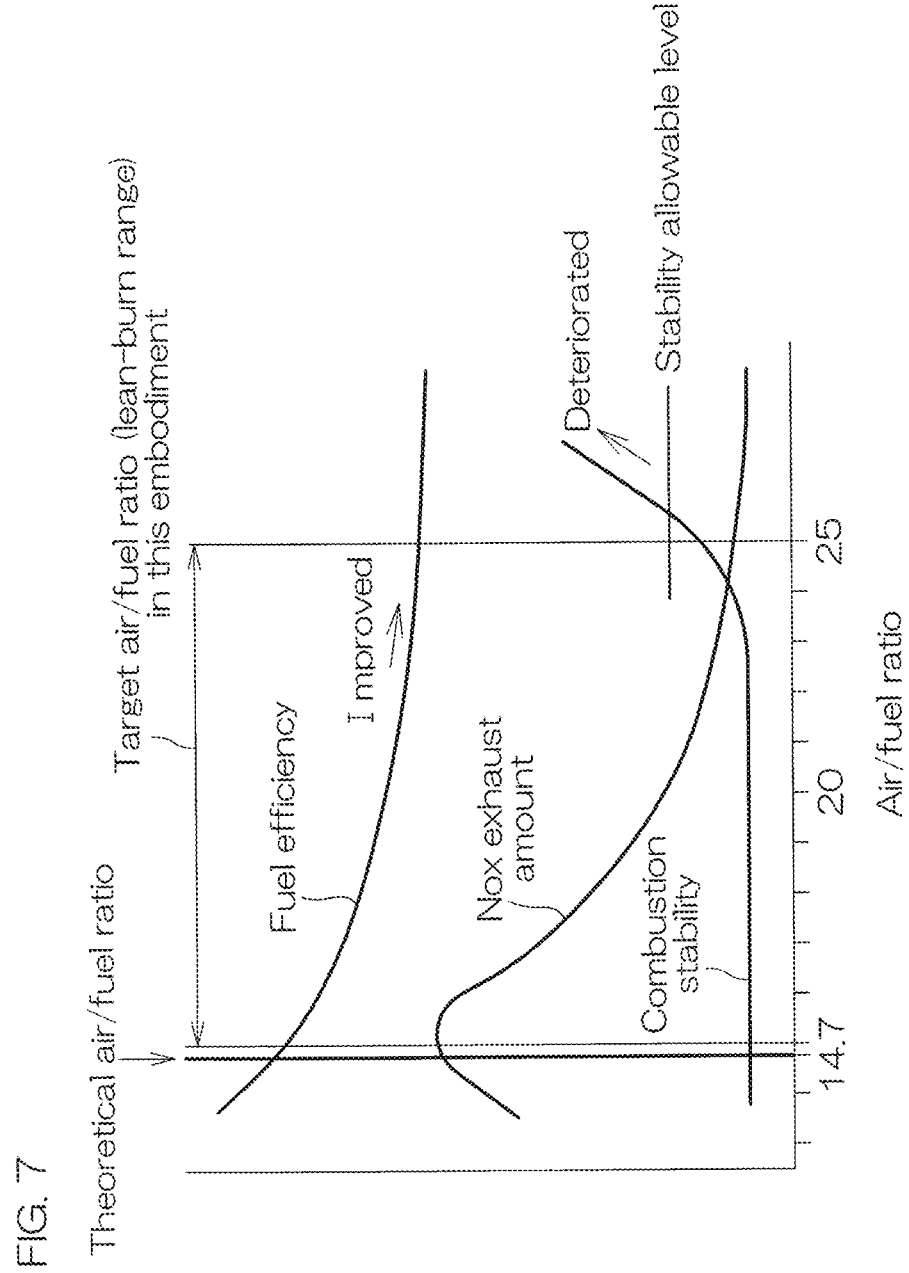
FIG. 7 is a diagram for describing a target air/fuel ratio.

FIG. 7 is a diagram for describing the target air/fuel ratio in the present preferred embodiment. The air/fuel ratio herein refers to an air amount with respect to a fuel amount, and the target value of the air/fuel ratio is the target air/fuel ratio. In the present preferred embodiment, the target air/fuel ratio is set to not lower than about 15 and not higher than about 25, more specifically not lower than about 20 and not higher than about 23.5, still more specifically not lower than about 21 and not higher than about 22.

The ratio of the least amount of air theoretically required for the complete combustion of the fuel with respect to the fuel amount is referred to as theoretical air/fuel ratio, and the value thereof is 14.7. The target air/fuel ratio is typically set around the theoretical air/fuel ratio. Particularly, where a three-way catalyst is provided in the exhaust channel, the exhaust gas cleaning function of the three-way catalyst can be maximized by the combustion at around the theoretical air/fuel ratio. Where the air/fuel ratio is lower than the theoretical air/fuel ratio, the combustion occurs in a fuel-rich state as compared with the combustion at the theoretical air/fuel ratio. Where the air/fuel ratio is higher than the theoretical air/fuel ratio, the combustion occurs in a fuel-lean state as compared with the combustion at the theoretical air/fuel ratio.

The combustion at an air/fuel ratio in a range higher than the theoretical air/fuel ratio is referred to as lean burn, and an air/fuel ratio range for the lean burn is referred to as lean-burn range. Where the fuel injection amount control is performed with the target air/fuel ratio set in the lean-burn range, the fuel efficiency is able to be improved.

In the present preferred embodiment, the air/fuel ratio is able to be set in a lean-burn range of not lower than about 15 (more specifically not lower than about 20, still more specifically about 21 to about 22) by the provision of the supercharging device 70 (the supercharger 70A in the present preferred embodiment). Where the air/fuel ratio falls within a range of not lower than about 15 and not higher than about 25, the combustion stability is maintained at not higher than a stability allowable level, thus providing a stable combustion operation and improved the fuel efficiency.

Figure 8:
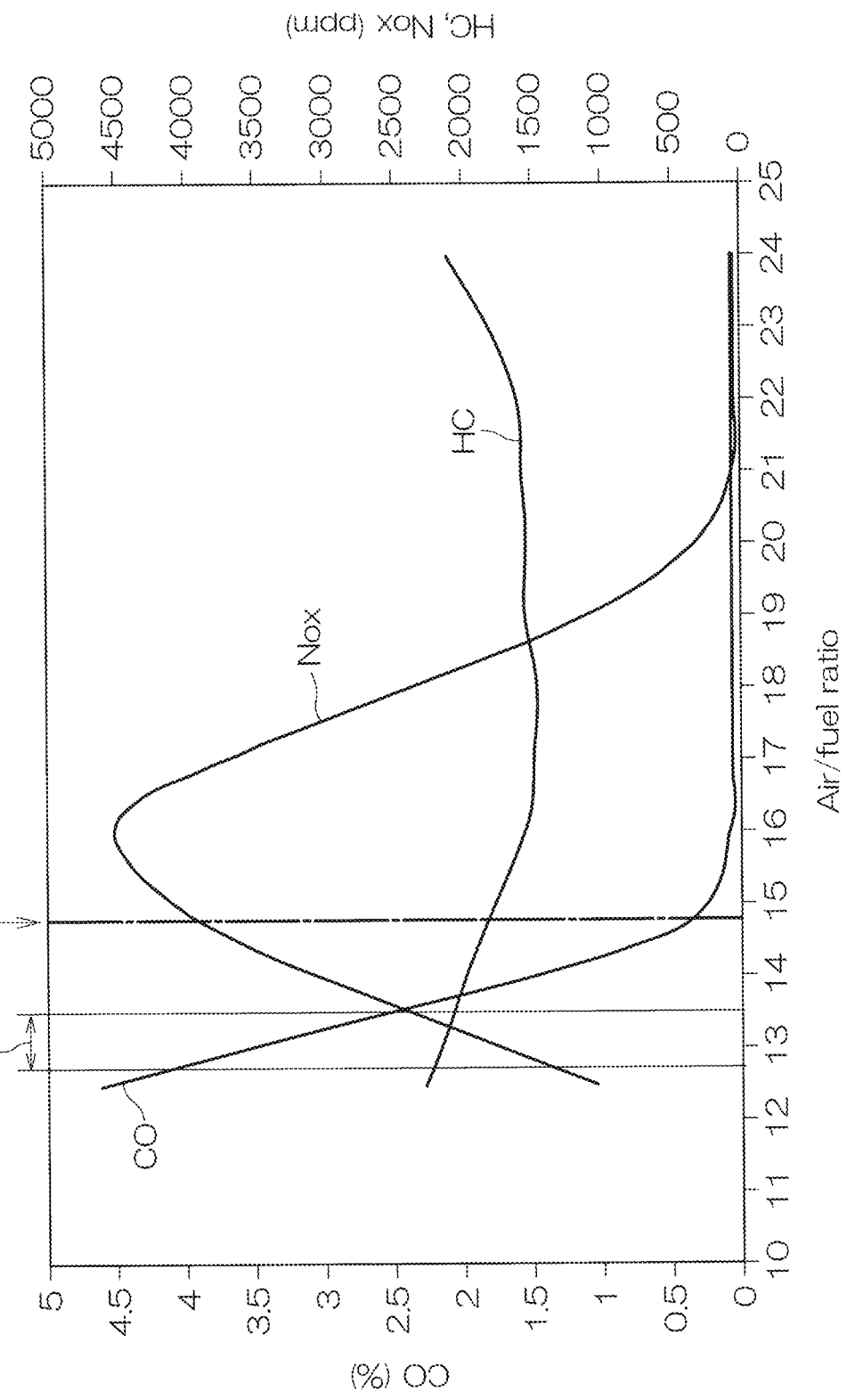
FIG. 8 shows relationships between an air/fuel ratio and the concentrations of pollutants in exhaust gas.

FIG. 8 shows relationships between the air/fuel ratio and the concentrations of pollutants in the exhaust gas. At the theoretical air/fuel ratio, the nitrogen oxide (NOx) concentration is about 3,500 ppm, the hydrocarbon (HC) concentration is about 1,800 ppm, and the carbon monoxide (CO) concentration is about 0.3%. At the theoretical air/fuel ratio, the nitrogen oxide concentration is relatively high. Therefore, where the combustion operation is performed with the target air/fuel ratio set in an air/fuel ratio range 90 lower than the theoretical air/fuel ratio, and the exhaust gas is cleaned with the use of the three-way catalyst, excellent exhaust gas performance is achieved.

On the other hand, where the air/fuel ratio falls within the lean-burn range higher than the theoretical air/fuel ratio, particularly where the air/fuel ratio falls within a range of not lower than about 20 and not higher than about 23.5, the nitrogen oxide (NOx) concentration is less than about 500 ppm (more specifically, less than about 300 ppm), the hydrocarbon (HC) concentration is less than about 2,000 ppm, and the carbon monoxide (CO) concentration is zero or substantially zero. Where the engine 20 is operated with the air/fuel ratio set in this range, therefore, the cleaning of the exhaust gas with the use of the catalyst is no longer required. Thus, the fuel efficiency is improved. Where the air/fuel ratio falls within a range of not lower than about 21 and not higher than about 22, the nitrogen oxide (NOx) concentration and the carbon monoxide (CO) concentration are zero or substantially zero, and the hydrocarbon (HC) concentration is around the lower limit value. Therefore, an excellent exhaust gas performance is achieved without the use of the catalyst for cleaning the exhaust gas.

In the present preferred embodiment, the provision of the supercharging device 70 makes it possible to operate the engine 20 at an air/fuel ratio of not lower than about 20 in the lean-burn range, thus improving the fuel efficiency. Of course, the provision of the supercharging device 70 makes it possible to increase the power output with a smaller number of cylinders with a smaller displacement volume, thus improving the fuel efficiency.

According to the present preferred embodiment, the engine 20 of the outboard motor 1 achieves excellent exhaust gas performance and fuel efficiency and is able to generate a higher output power even with a catalyst-free construction including no catalyst in the exhaust channel 59.

Figure 9:
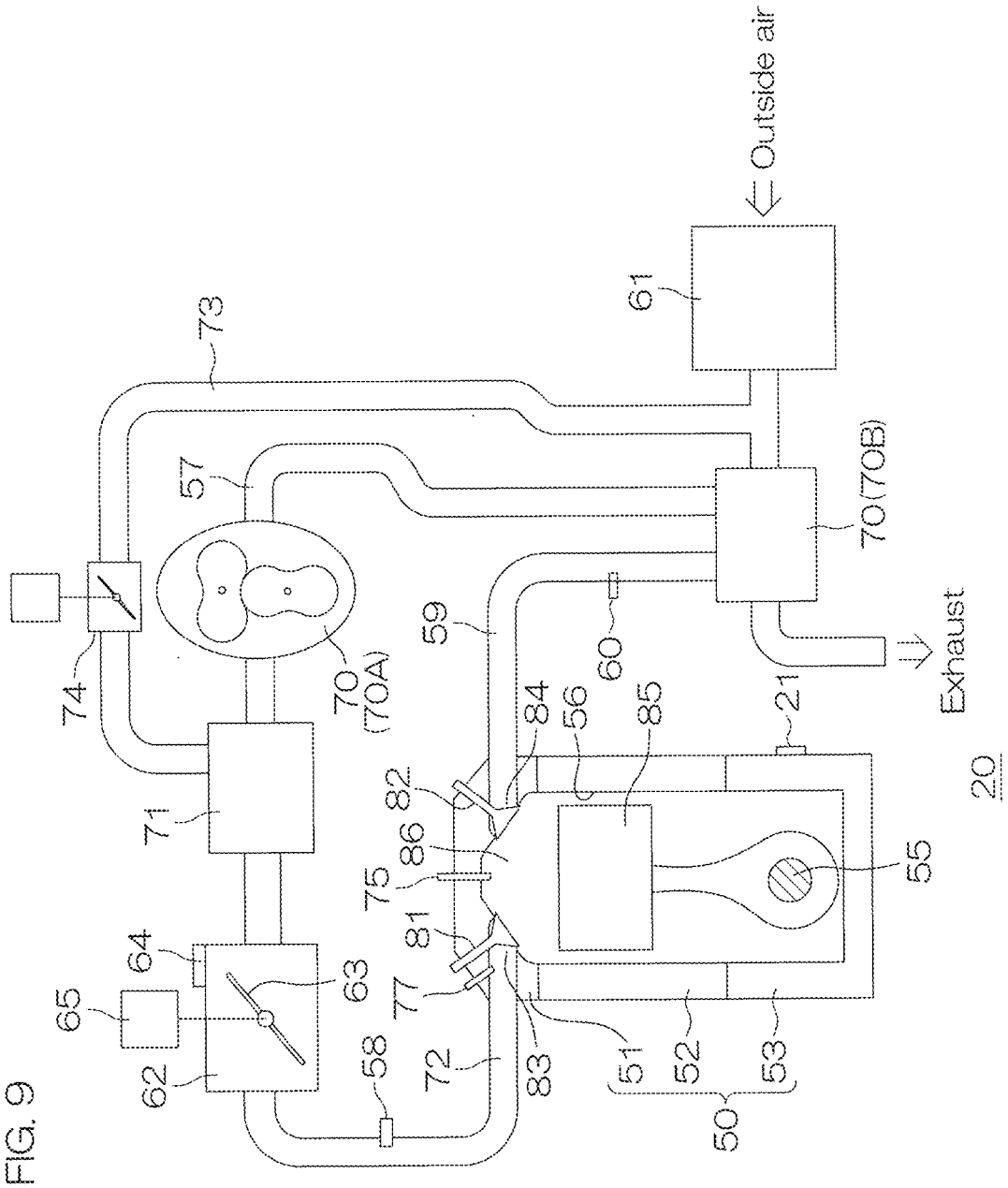
FIG. 9 is a conceptual diagram for describing a structure according to another preferred embodiment of the present invention.
Figure 10:
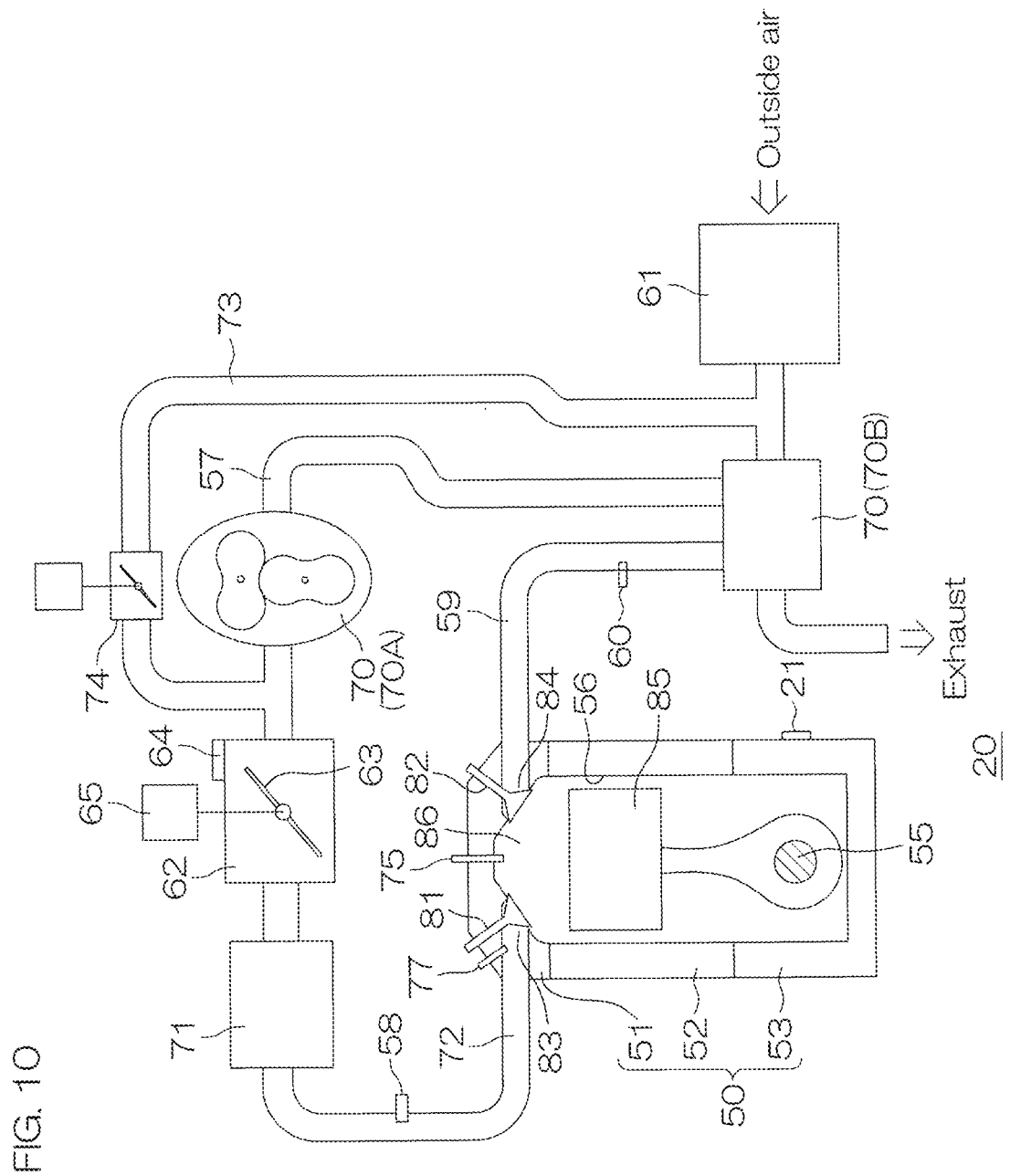
FIG. 10 is a conceptual diagram for describing a structure according to a further preferred embodiment of the present invention.

FIGS. 9 and 10 are conceptual diagrams for describing structures according to other preferred embodiments of the present invention. Although the throttle body 62 is upstream of the supercharger 70A in the air intake channel 57 in the preferred embodiments described above, the throttle body 62 is downstream of the supercharger 70A in the structures shown in FIGS. 9 and 10. In the example of FIG. 9, the throttle body 62 is downstream of the air cooler 71. In the example of FIG. 10, the throttle body 62 is upstream of the air cooler 71. In the structure shown in FIG. 10, the air bypass channel 73 is connected to the air intake channel 57 at a position between the throttle body 62 and the supercharger 70A to provide an air channel bypassing the supercharger 70A.

As shown in FIGS. 9 and 10, a turbocharger 70B (another example of the supercharging device 70) may be provided in addition to the supercharger 70A or instead of the supercharger 70A. The turbocharger 70B is a supercharging device 70 that is driven by a turbine provided in the exhaust channel 59 to compress the air introduced into the air intake channel 57 and force the air toward the cylinder block 50.

While preferred embodiments of the present invention have thus been described specifically, the present invention may be embodied in other ways as will be described below.

The watercraft propulsion system is not limited to the outboard motor, but may be an inboard motor, an inboard/outboard motor, and a water jet propulsion system.

Although the preferred embodiments of the present invention described above are directed to structures without an exhaust gas cleaning catalyst, an exhaust gas cleaning catalyst may be provided in the exhaust channel 59.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft propulsion system to be provided on a watercraft including a hull, the watercraft propulsion system comprising:
    an engine including a cylinder block, an air intake channel connected to the cylinder block, an exhaust channel connected to the cylinder block, a supercharging device in the air intake channel, and a fuel injector;
    a propulsion unit to be driven by the engine and to apply a propulsive force to the hull;
    a rotation speed sensor to detect a rotation speed of the engine;
    an air intake pressure sensor to detect an air intake pressure of the engine; and
    a controller configured or programmed to compute a command fuel injection amount so that the engine performs a combustion operation at an air/fuel ratio in a lean-burn range according to the rotation speed detected by the rotation speed sensor and the air intake pressure detected by the air intake pressure sensor, and to drive the fuel injector based on the computed command fuel injection amount.

2. The watercraft propulsion system according to claim 1, wherein the controller is configured or programmed to compute the command fuel injection amount so that the engine performs the combustion operation at an air/fuel ratio of not lower than about 15 and not higher than about 25.

3. The watercraft propulsion system according to claim 1, wherein exhaust gas generated by the engine has a nitrogen oxide concentration of zero or substantially zero without use of an exhaust gas cleaning catalyst in the exhaust channel.

4. The watercraft propulsion system according to claim 1, wherein exhaust gas generated by the engine has a carbon monoxide concentration of zero or substantially zero without use of an exhaust gas cleaning catalyst in the exhaust channel.

5. The watercraft propulsion system according to claim 1, wherein exhaust gas generated by the engine has a hydrocarbon concentration of less than about 2,000 ppm without use of an exhaust gas cleaning catalyst in the exhaust channel.

6. The watercraft propulsion system according to claim 1, further comprising:
    an air/fuel ratio sensor in the exhaust channel; wherein
    the controller is configured or programmed to function as a target fuel injection amount computation unit to compute a target fuel injection amount of a target air/fuel ratio to be set within the lean-burn range according to the rotation speed detected by the rotation speed sensor and the air intake pressure detected by the air intake pressure sensor, and as a correction unit to correct the target fuel injection amount through feedback control by comparing the target air/fuel ratio with an actual air/fuel ratio detected by the air/fuel ratio sensor in order to compute the command fuel injection amount.

7. The watercraft propulsion system according to claim 1, wherein the supercharging device includes a supercharger to be driven by rotation of a crank shaft of the engine.

8. The watercraft propulsion system according to claim 1, wherein the supercharging device includes a turbocharger to be driven by exhaust gas flowing through the exhaust channel.

9. The watercraft propulsion system according to claim 1, wherein
    the engine includes a crank shaft extending vertically; and
    the watercraft propulsion system is an outboard motor including a drive shaft extending vertically and connected to the crank shaft, a propeller shaft extending horizontally, a propeller connected to the propeller shaft and functioning as the propulsion unit, and a transmission to transmit rotation of the drive shaft to the propeller shaft.

10. A watercraft comprising:
    a hull; and
    a watercraft propulsion system in the hull to apply a propulsive force to the hull; wherein
    the watercraft propulsion system is the watercraft propulsion system according to claim 1.

11. The watercraft propulsion system according to claim 1, wherein an exhaust gas cleaning catalyst is not provided in the exhaust channel.

* * * * *